US008548699B2

(12) United States Patent
Webert et al.

(10) Patent No.: US 8,548,699 B2
(45) Date of Patent: Oct. 1, 2013

(54) CONTROL SYSTEM AND METHOD FOR ADAPTIVE CONTROL OF TRANSMISSION FLUID OPERATING PRESSURES

(75) Inventors: David C. Webert, Livonia, MI (US); Todd R. Berger, Pinckney, MI (US); Timothy R Stockdale, Brighton, MI (US); Matthew D. Whitton, Howell, MI (US)

(73) Assignee: GM Global Technology Operations LLC

( * ) Notice: Subject to any disclaimer, the term of this patent is extended or adjusted under 35 U.S.C. 154(b) by 377 days.

(21) Appl. No.: 12/787,022

(22) Filed: May 25, 2010

(65) Prior Publication Data

US 2011/0295472 A1    Dec. 1, 2011

(51) Int. Cl.
*G06F 19/00*    (2011.01)

(52) U.S. Cl.
USPC .......................................................... 701/58

(58) Field of Classification Search
USPC ...................... 701/58; 477/174, 54; 475/120
See application file for complete search history.

(56) References Cited

U.S. PATENT DOCUMENTS

| 5,458,545 | A | 10/1995 | Adam et al. |
| 6,022,293 | A | 2/2000 | Dourra et al. |
| 6,471,613 | B1 | 10/2002 | Botosan et al. |
| 6,991,585 | B2 * | 1/2006 | Colvin et al. ................. 477/174 |
| 7,164,981 | B2 | 1/2007 | Kim |
| 2008/0032859 | A1 * | 2/2008 | Trush et al. ..................... 477/54 |

FOREIGN PATENT DOCUMENTS

DE        69807772 T2    2/2003

* cited by examiner

*Primary Examiner* — John Pauls

(57) ABSTRACT

A control system for a transmission includes a pressure control module and a pressure adapt module. The pressure control module operates a hydraulic control system of the transmission at a target pressure during steady-state operation of the transmission. The target pressure is based on first and second learned pressures for different predetermined first and second torque ranges. The pressure adapt module selectively adjusts at least one of the first learned pressure and the second learned pressure based on a first pressure at which a slip condition of the transmission occurs. The first and second learned pressures define a learned pressure gain and offset. When adjusting the first and second learned pressures, the pressure adapt module limits increases and decreases in the learned pressure gain offset based on a predetermined pressure gain and offset. A method is also provided.

20 Claims, 9 Drawing Sheets

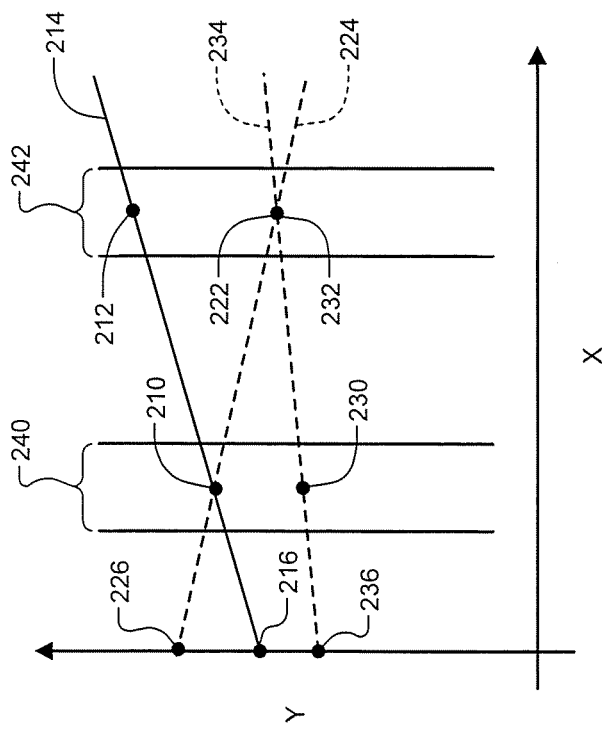
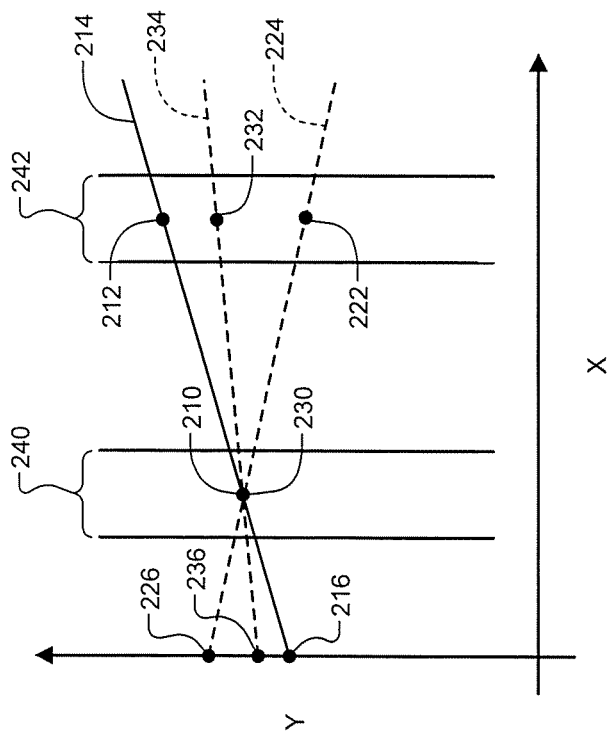
FIG. 7
FIG. 6

CONTROL SYSTEM AND METHOD FOR ADAPTIVE CONTROL OF TRANSMISSION FLUID OPERATING PRESSURES

FIELD

The present disclosure relates to systems and methods for controlling automatic transmissions of motorized vehicles, and more particularly, to control systems and methods for controlling transmission fluid operating pressures.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some vehicles include a powerplant and an automatic transmission that transmits drive torque at various gear ratios or ranges to a drivetrain. Typically, the transmission includes a torque converter for coupling the transmission and the powerplant. A geartrain transmits drive torque transmitted by the torque converter at the various gear ratios or ranges. The transmission may further include hydraulic elements (e.g., valves, actuators, and the like) that control operation of the torque converter and the geartrain. The transmission may further include a fluid pump for generating pressurized fluid within the transmission used to operate the hydraulic elements.

For example, the torque converter may include a hydraulically-actuated lock-up clutch operable to selectively mechanically couple a pump element and a turbine element. The geartrain may include one or more hydraulically-actuated mechanisms, such as a friction clutch, that selectively couple various components of the geartrain and thereby vary the gear ratio at which the drive torque is transmitted.

Transmission control systems have been developed to control the fluid pressures at which a transmission is operated. However, the control systems may operate the transmission at fluid pressures above those required to properly operate a particular transmission. The fluid pressures are typically higher than required to account for variation in transmission builds and variation during use.

SUMMARY

In one form, the present disclosure provides a control system for a transmission that includes a pressure control module and a pressure adapt module. The pressure control module operates a hydraulic control system of the transmission at a target pressure during steady-state operation of the transmission. The target pressure is based on a first learned pressure for a predetermined first torque range and a second learned pressure for a predetermined second torque range different than the predetermined first torque range. The pressure adapt module selectively adjusts at least one of the first learned pressure and the second learned pressure based on a first pressure at which a slip condition of the transmission occurs.

In one feature, the pressure adapt module induces the slip condition based on an input torque and a torque converter speed of the transmission. The pressure adapt module induces the slip condition when the input torque is within one of the predetermined first torque range and the predetermined second torque range, and the torque converter speed is within a corresponding one of a predetermined first speed range and a predetermined second speed range. In a related feature, the pressure adapt module induces the slip condition by instructing the pressure control module to lower an operating pressure of the hydraulic control system from the target pressure at a predetermined first rate.

In another feature, the pressure adapt module increases the first and second learned pressures by a difference between the target pressure and the first pressure when the slip condition is an unintended slip condition that occurs while operating the transmission at the target pressure.

In yet another feature, the target pressure is based on a learned pressure gain and a learned pressure offset defined by the first and second learned pressures. In related features, the pressure adapt module limits an increase in the learned pressure gain by adjusting at least one of the first learned pressure and the second learned pressure based on the first pressure and a predetermined pressure offset. In another related feature, the pressure adapt module limits a decrease in the learned pressure gain by adjusting at least one of the first learned pressure and the second learned pressure based on the first pressure and a predetermined pressure gain.

In further features, the pressure adapt module adjusts at least one of the first learned pressure and the second learned pressure based on a first elapsed time and a second elapsed time. The first elapsed time is an elapsed time since the pressure adapt module last adjusted the first learned pressure. The second elapsed time is an elapsed time since the pressure adapt module last adjusted the second learned pressure.

In other features, the hydraulic control system controls operation of a torque converter lock-up mechanism of the transmission. In yet other features, the hydraulic control system controls a mechanism selectively engageable with a geartrain of the transmission for effecting gear changes.

In another form, the present disclosure provides a method for controlling a transmission. The method includes operating a hydraulic control system of the transmission at a target pressure during steady-state operation of the transmission. The target pressure is based on a first learned pressure for a predetermined first torque range and a second learned pressure for a predetermined second torque range different than the predetermined first torque range. The method further includes selectively adjusting at least one of the first learned pressure and the second learned pressure based on a first pressure at which a slip condition of the transmission occurs.

In one feature, the method further includes inducing the slip condition based on an input torque and a torque converter speed of the transmission. The slip condition is induced when the input torque is within one of the predetermined first torque range and the predetermined second torque range, and the torque converter speed is within a corresponding one of a predetermined first speed range and a predetermined second speed range. In a related feature, the inducing the slip condition includes lowering an operating pressure of the hydraulic control system from the target pressure at a predetermined first rate.

In another feature, the selectively adjusting includes increasing the first and second learned pressures by a difference between the target pressure and the first pressure when the slip condition is an unintended slip condition.

In yet another feature, the method further includes determining a learned pressure gain and a learned pressure offset. The learned pressure gain and offset are determined based on the first and second learned pressures. In a related feature, the method further includes determining the target pressure based on the learned pressure gain and the learned pressure offset. In another related feature, the selectively adjusting includes limiting an increase in the learned pressure gain by adjusting at least one of the first learned pressure and the second learned pressure based on the first pressure and a predetermined pressure offset. In yet another related feature, the selectively adjusting includes limiting a decrease in the learned pressure gain by adjusting at least one of the first learned pressure and the second learned pressure based on the first pressure and a predetermined pressure gain.

In further features, the selectively adjusting includes adjusting at least one of the first learned pressure and the second learned pressure based on a first elapsed time and a second elapsed time. The first elapsed time is an elapsed time since last adjusting the first learned pressure. The second elapsed time is an elapsed time since last adjusting the second learned pressure.

In other features, the hydraulic control system controls operation of a torque converter lock-up mechanism of the transmission. In yet other features, the hydraulic control system controls a mechanism selectively engageable with a geartrain of the transmission for effecting gear changes.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 6 is a plot of learned fluid pressures as a function of transmission input torque illustrating a second slow limiting example according to the present disclosure;

FIG. 7 is a plot of learned fluid pressures as a function of transmission input torque illustrating a second fast limiting example according to the present disclosure.

DETAILED DESCRIPTION

Figure 1:
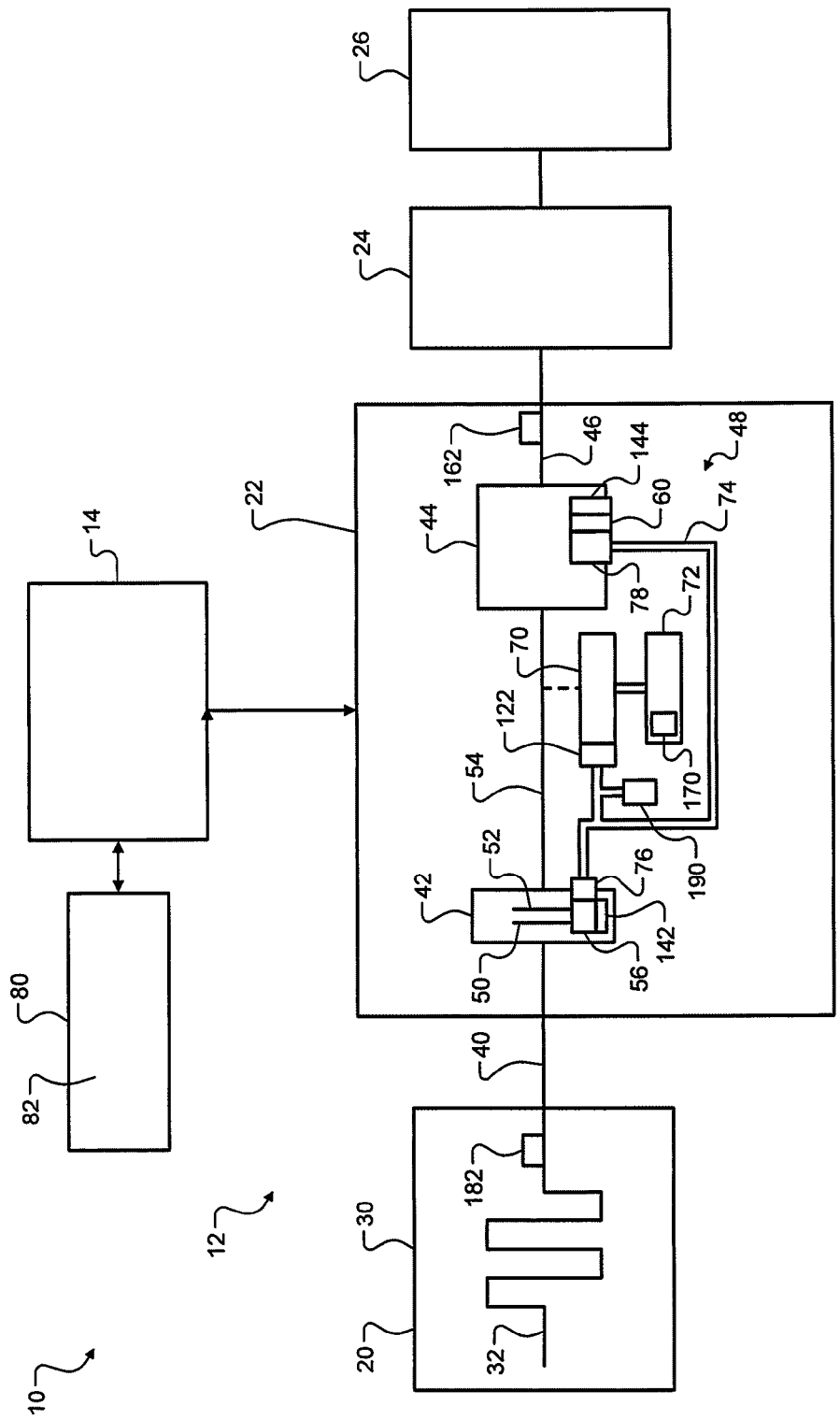
FIG. 1 is a functional block diagram illustrating an exemplary vehicle system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure provides an exemplary control system and method for adaptive control of steady-state transmission fluid operating pressures. The control system includes a pressure control module that operates the transmission at a target fluid operating pressure determined from reference base pressures, a first learned fluid pressure, and a second learned fluid pressure. The first and second learned fluid pressures are stored in memory tables for each steady-state operating state of the transmission. The first and second learned fluid pressures define a learned pressure gain and a learned pressure offset. The target fluid operating pressure is further determined based on the learned pressure gain and offset.

The control system further includes a pressure adapt module that periodically adjusts the first and second learned fluid pressures after executing one of a first, active learn procedure and second, remedial learn procedure. By adjusting the first and second learned fluid pressures, the pressure adapt module adjusts the learned pressure gain and offset used to determine the target fluid operating pressure. The pressure adapt module adjusts the first and second learned fluid pressures based on a minimum fluid operating pressure at various transmission input torque levels required to avoid transmission slip. The pressure adapt module learns the minimum fluid operating pressures by selectively executing the active and remedial learn procedures during steady-state operation of the transmission.

The active learn procedure is executed while the transmission is operated in one of a first learn region and a second learn region. The first learn region is defined by a first transmission input torque range and a first torque converter turbine speed range. The second learn region defined by a second transmission input torque range different than the first transmission input torque range and a second torque converter turbine speed range.

During the active learn procedure, the pressure adapt module instructs the pressure control module to decrease the fluid operating pressure of the transmission at a predetermined first rate until the transmission begins to slip. Based on a commanded fluid operating pressure at or near the point in time when the transmission begins to slip, the pressure adapt module selectively adjusts one or both the first and second learned fluid pressures. By inducing transmission slip in a controlled manner, the pressure adapt module actively learns the minimum fluid operating pressures. The pressure adapt module selectively adjusts the first and second learned fluid pressures to limit a corresponding change in one or both the learned pressure gain and offset. The pressure adapt module further limits the learned pressure gain and offset to within corresponding predetermined limits.

The remedial learn procedure is executed when unintended transmission slip is detected. When unintended transmission slip is detected, the pressure adapt module obtains the target fluid operating pressure at or near the point in time when the transmission slip was detected. Based on the target fluid operating pressure at or near the time of slip, the pressure adapt module selectively increases the first and second learned fluid pressures. By increasing the first and second learned fluid pressures, the pressure adapt module increases the target fluid operating pressures. In this way, the pressure adapt module modifies the adjustments made under the active learn procedure and avoids undesirably low target fluid operating pressures.

The method includes determining the target fluid operating pressure based on reference base pressures, a first learned fluid pressure, and a second learned fluid pressure stored in memory tables for each steady-state operating state of the transmission. The determining the target fluid operating pressure includes calculating a learned pressure gain and a learned pressure offset based on the first and second learned fluid pressures.

The method further includes selectively adjusting the first and second learned fluid pressures by determining a minimum pressure required for operating the transmission at various transmission input torque levels. The selectively adjusting includes adjusting one or both the first and second learned fluid pressures to limit a change in one or both the learned pressure gain and offset. The selectively adjusting further includes adjusting one or both the first and second learned fluid pressures to limit the pressure gain and/or offset to within predetermined limits.

The control system and method of the present disclosure enables the transmission to be operated at lower fluid operating pressures than other known transmission control systems and methods. By lowering the fluid operating pressures, the control system and method of the present disclosure can decrease the energy consumption of the transmission. By decreasing energy consumption, fuel economy can be improved. The control system and method of the present disclosure also enable the transmission to be operated at fluid pressures exhibiting a more consistent margin of safety than other known transmission control systems and methods.

With particular reference to FIG. 1, an exemplary vehicle system 10 according to the present disclosure is presented. The vehicle system 10 includes a powertrain 12 controlled by one or more control modules such as, but not limited to, a combination of a powertrain control module, a transmission control module, and/or an engine control module. For simplicity, a single control module 14 that controls operation of the powertrain 12 is shown. The powertrain 12 includes a powerplant 20 coupled with an automatic transmission 22 and a drivetrain 24. The powerplant 20 produces drive torque that is transmitted through the transmission 22 at various gear ratios or ranges to the drivetrain 24 to drive one or more wheels 26. The powerplant 20 may be a hybrid powerplant including two or more distinct sources of rotational power, such as an internal combustion engine, an electric machine, or combination thereof. For purposes of the present disclosure, the powerplant 20 includes an internal combustion engine 30 having a crankshaft 32 drivingly coupled with the transmission 22.

The transmission 22 includes an input shaft 40 coupled with the crankshaft 32, a torque converter (TC) 42 coupling the input shaft 40 with a geartrain 44, an output shaft 46, and a hydraulic control system 48 for controlling operation of various components of the transmission 22. The TC 42 includes a pump element 50, a turbine element 52 fluidly coupled with the pump element 50, and a stator (not shown) interposed between the pump element 50 and the turbine element 52. The pump element 50 is drivingly coupled with the input shaft 40. The turbine element 52 is drivingly coupled with the geartrain 44 via an intermediate shaft 54. The TC 42 further includes a hydraulically-actuated lock-up clutch 56 operable to selectively mechanically couple the pump element 50 and the turbine element 52. By mechanically coupling the pump and turbine elements 50, 52, the lock-up clutch 56 can inhibit relative rotational movement (i.e., slippage) between the pump element 50 and the turbine element 52. The lock-up clutch 56 is operable to selectively operate the TC 42 in a locked state (i.e., mechanically coupled state) or an unlocked state (i.e., mechanically uncoupled state).

The geartrain 44 may transmit torque transmitted by the TC 42 to the geartrain 44 to the output shaft 46 of the transmission 22 at one or more gear ratios. Accordingly, the geartrain 44 may include one or more planetary gearsets (not shown) for transmitting torque at one or more fixed gear ratios. Alternately, the geartrain 44 may be a continuously variable geartrain that transmits torque at continuously variable gear ratios. According to the present example, the geartrain 44 transmits torque at a predetermined number (N) of fixed gear ratios. More specifically, the geartrain 44 is operable to transmit torque at six (6) forward gear ratios and one (1) reverse gear ratio. The geartrain 44 may include one or more hydraulically-actuated clutches, bands, or the like, selectively engageable with components of the geartrain 44 for effecting gear changes. In one example, the geartrain 44 may include a dual clutch arrangement for effecting gear changes. For simplicity, the clutches, bands and the like will be referred to collectively in the drawings and the following description as clutches 60.

The hydraulic control system 48 controls operation of various components of the transmission 22, such as the TC 42 and/or the geartrain 44. According to the present example, the hydraulic control system 48 includes a fluid pump 70 that draws hydraulic fluid collected in a sump 72 and supplies the hydraulic fluid under pressure to a fluid control circuit 74 for controlling one or more hydraulic actuators of the transmission 22. The fluid pump 70 may be rotatably driven by the intermediate shaft 54. Although not shown, it will be appreciated that the fluid control circuit 74 may include hydraulic elements such as poppet valves, check valves, and the like, for controlling fluid flow within the fluid control circuit 74. The hydraulic actuators may include a first hydraulic actuator 76 for the lock-up clutch 56 of the TC 42 and second hydraulic actuators 78 for the clutches 60 used to effect gear changes.

Generally, the control module 14 controls operation based on inputs received from various driver interface devices 80, including a transmission range selector 82, and sensors that sense various operating conditions of the powertrain 12. According to the present disclosure, the control module 14 controls the pressure of the hydraulic fluid supplied to the fluid control circuit 74 of the transmission 22. More specifically, the control module 14 provides for adaptive control of steady-state transmission fluid operating pressures.

Figure 2:
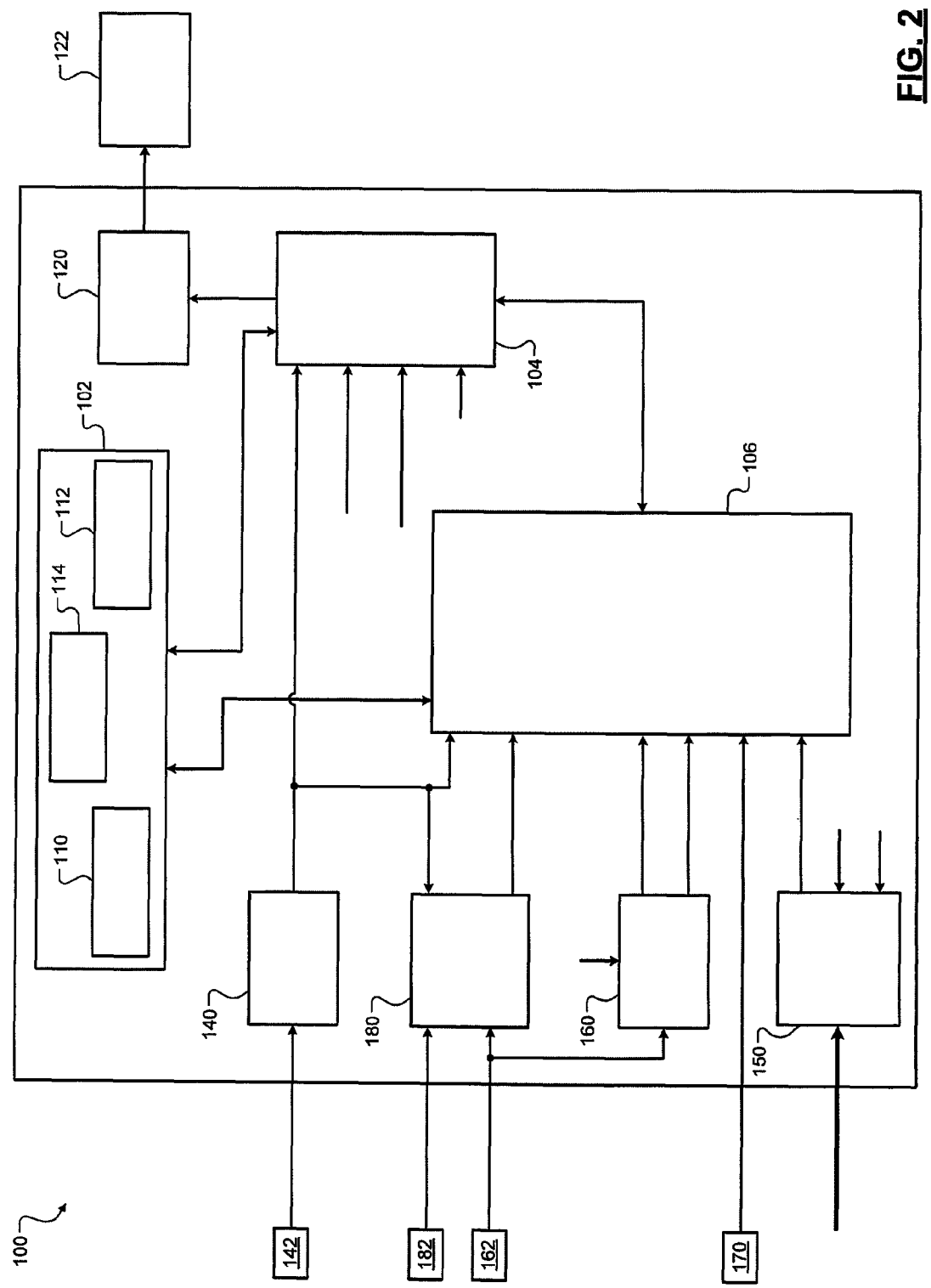
FIG. 2 is a functional block diagram illustrating an exemplary implementation of the control module shown in FIG. 1 in an exemplary transmission control system according to the present disclosure.

With particular reference to FIG. 2, an exemplary implementation of the control module 14 in an exemplary transmission control system 100 according to the present disclosure is presented. The control module 14 includes non-volatile memory 102, a pressure control module 104, and a pressure adapt module 106.

The memory 102 includes reference pressure tables 110, learned pressure data tables 112, and a parameter table 114. The reference pressure tables 110 provide reference base fluid operating pressures (reference base pressures) used to control transmission fluid operating pressures during steady-state operation of the transmission 22. The memory 102 includes a reference pressure table 110 and a corresponding learned pressure data table 112 for each of a predetermined number (P) of predefined steady-state operating states (SS operating states) of the transmission 22. In general terms, the number of SS operating states of the transmission 22 will depend on the number N of fixed gear ratios and whether the TC 42 includes a lock-up clutch 56.

In the present example, the number P of SS operating states is fourteen (14). There are six (6) SS operating states for the six forward gears with the lock-up clutch 56 actuated (i.e., engaged) and an additional six (6) SS operating states for the six forward gears with the lock-up clutch 56 de-actuated. There is an additional SS operating state for the reverse gear. There is another additional SS operating state for the first forward gear in which the lock-up clutch 56 is actuated and the transmission 22 includes a mechanism, such as a one-way clutch, that provides an overrun feature. The overrun feature enables the engine 30 to return to idle under certain conditions, such as during vehicle coastdown.

The reference pressure tables 110 are memory tables including reference base pressures based on a rotational speed of the turbine element 52 (TC turbine speed) and an input torque of the transmission 22 (transmission input torque). The reference pressure tables 110 include a memory table for each of the SS operating states. In the present example, the reference pressure tables 110 are five by nine tables including reference base pressures for five (5) TC turbine speed ranges and (9) transmission input torques.

The learned pressure data tables 112 are memory tables including a first learned fluid pressure and a second learned fluid pressure for each of the SS operating states. The first learned fluid pressures are learned fluid pressures within predetermined first transmission input torque ranges of first learn regions of each of the SS operating states. The second learned fluid pressures are learned fluid pressures within predetermined second transmission input torque ranges of second learn regions of each of the SS operating states. The learned pressure data tables 112 further include a first learned transmission input torque associated with the first learned fluid pressure and a second learned transmission input torque associated with the second learned fluid pressure. Together, the first learned fluid pressure and transmission input torque define a first learned fluid pressure operating point. The second learned fluid pressure and transmission input torque define a second learned fluid pressure operating point.

The first and second learned fluid pressure operating points define a learned pressure gain and a learned pressure offset for each of the SS operating states. The learned pressure gain is a slope of a trendline (learned pressure trendline) defined between the first and second learned fluid pressure operating points in a plot of pressure (y-axis) versus torque (x-axis), where the axes of the plot cross at zero. The learned pressure offset is a y-intercept of the learned pressure trendline.

The first learn regions are defined by a predetermined first TC turbine speed range and a corresponding predetermined first transmission input torque range for each of the SS operating states. The second learn region is defined by predetermined a predetermined second TC turbine speed range and a corresponding predetermined second transmission input torque range for each of the SS operating states. The first and second learn regions are further defined by a predetermined transmission temperature range. The predetermined first and second TC turbine speed ranges and corresponding predetermined first and second transmission input torque ranges of one SS operating state may be different from those of another SS operating state. The predetermined transmission temperature range may be the same for each of the SS operating states. For purposes of the present disclosure, the second transmission input torque ranges define torques greater than the torques defined by the first transmission input torque ranges for each range of the transmission. Thus, the first learn region may define a low torque learn region and the second learn region may define a high torque learn region.

For example only, the predetermined first TC turbine speed ranges may define a range between around 1,200 revolutions per minute (RPM) and 2,500 RPM. The predetermined second TC turbine speed ranges may define a range between around 1,450 RPM and 2,500 RPM. The predetermined first transmission input torque ranges may define a range between around twenty (20) and forty (40) percent of a maximum transmission input torque. The predetermined second transmission input torque ranges may define a range between around sixty (60) and one hundred (100) percent of the maximum transmission input torque. The predetermined transmission temperature range may define a range between around sixty (60) and one hundred (100) degrees Celsius (° C.).

Initially, the first and second learned minimum pressures and, therefore, the learned pressure gain and offset for each operating state, may be based on the reference base pressures at the lowest TC turbine speed range for the corresponding SS operating state. For example only, the initial learned pressure gain and offset may be based on a best-fit trendline (base pressure trendline) through the nine reference base pressures when plotted at the nine minimum transmission input torques defined by the nine transmission input torque ranges of the lowest TC turbine speed range. During operation of the transmission 22, the first and second learned fluid pressures for each of the SS operating states are selectively adjusted by the pressure adapt module 106 based on new first and second learned minimum transmission operating pressures as discussed in further detail below. The new first and second learned fluid pressures are used to determine a target fluid operating pressure (target operating pressure) at which the transmission 22 is to be operated.

The parameter tables 114 include tables of predetermined control parameters for each of the SS operating states used by the various modules of the control module 14 according to the present disclosure.

The control parameters include the first and predetermined second transmission input torque and TC turbine speed ranges for the first and second learn regions, respectively. The control parameters further include the predetermined transmission temperature range for the first and second learn regions. The control parameters also include predetermined control periods for each of the first and second learn regions of each SS operating state.

The pressure control module 104 controls the transmission fluid operating pressures during operation of the vehicle system 10 by monitoring various transmission operating conditions and determining the target operating pressure for the transmission 22. The transmission operating conditions include, but are not limited to, the operating state of the transmission 22 (transmission operating state), the rotational speed of the turbine element 52 (i.e., the TC turbine speed), an input torque of the transmission 22 (transmission input torque), and a transmission temperature.

According to the present disclosure, the pressure control module 104 determines the target operating pressure during steady-state operation based on the reference base pressures stored in the reference pressure tables 110 and the first and second learned fluid pressures stored in the learned pressure data tables 112. The target operating pressure may be calculated according to the following general equation:

$$P_{TARGET} = P_{ADJBASE} * \text{MULTIPLIER}_{TEMP} + \text{OFFSET}_{TEMP}. \quad (1)$$

In equation 1, $P_{TARGET}$ is the target operating pressure and $P_{ADJBASE}$ is an adjusted base pressure calculated based on reference base pressures and the first and second learned fluid pressures stored in the memory 102. MULTIPLIER$_{TEMP}$ is a predetermined scalar based on the current transmission temperature, and OFFSET$_{TEMP}$ is a predetermined pressure offset based on the current transmission temperature. For example only, MULTIPLIER$_{TEMP}$ may be equal to around 1.0 for transmission temperatures between 0° C. and 100° C. At transmission temperatures below 0° C. and above 100° C., MULTIPLIER$_{TEMP}$ can be greater than 1.0.

$P_{ADJBASE}$ may be calculated according to the following general equation:

$$P_{ADJBASE} = P_{MINIMUM} + SAFETY_{OFFSET} + BASESHAPE_{OFFSET} \quad (2)$$

In equation 2, $P_{MINIMUM}$ is a first calculated pressure for the current transmission input torque determined by interpolating between the first and second learned fluid pressure operating points stored in the memory 102. SAFETY$_{OFFSET}$ is a first pressure offset based on the current transmission input torque.

BASESHAPE$_{OFFSET}$ is a second pressure offset that is based on a comparison of a second calculated pressure ($P_{BASE}$) obtained from the reference pressure tables and a corresponding third calculated pressure determined from the base pressure trendline. The second calculated pressure is obtained by interpolating between two reference base pressures stored in the reference pressure tables 110 based on the current transmission input torque and the current TC turbine speed. The third calculated pressure is a pressure obtained from the base pressure trendline based on the current transmission input torque and the current TC turbine speed.

If the second calculated pressure, $P_{BASE}$, is greater than the third calculated pressure, then BASESHAPE$_{OFFSET}$ is equal to a difference between $P_{BASE}$ and the third calculated pressure. Otherwise, BASESHAPE$_{OFFSET}$ is equal to zero. Thus, BASESHAPE$_{OFFSET}$ may provide an increase in $P_{ADJBASE}$ based on the shape of the reference base pressures, but not a decrease. MULTIPLIER$_{TEMP}$, OFFSET$_{TEMP}$, and SAFETY$_{OFFSET}$ are control parameters that may be stored in the parameter tables 114 for retrieval.

The pressure control module 104 controls the transmission fluid operating pressures by controlling the pressure of the fluid output by the fluid pump 70. In the present example, the pressure control module 104 controls the fluid output pressures by determining the target operating pressure at which the transmission 22 is to be operated. The pressure control module 104 outputs a signal (Target Fluid Pressure) indicative of the target operating pressure. The Target Fluid Pressure signal may be output to a pressure actuator module 120 that controls a pump actuator 122 used to control the fluid output pressures. In various configurations, the pump actuator 122 may control the fluid output pressures by controlling a rotational speed of the fluid pump 70 and/or controlling operation of a pressure regulator (not shown) located at an outlet of the fluid pump 70. In the present example, the pressure actuator module 120 outputs a pressure control signal to the pump actuator 122 that is used to control the transmission fluid operating pressures.

The pressure adapt module 106 selectively adjusts the first and second learned fluid pressures stored in the memory 102 based on a transmission operating pressure at which a slip condition of the transmission 22 occurs. The pressure adapt module 106 selectively adjusts the first and second learned fluid pressures based on one of a first, active learn procedure and a second, remedial learn procedure. The pressure adapt module 106 determines whether to execute the active or remedial learn procedures based on various transmission operating conditions. The various operating conditions include, but are not limited to, the current SS operating state, the current transmission input torque, the current TC turbine speed, the current transmission temperature, and transmission slip.

During the active learn procedure, as discussed in more detail below, the pressure adapt module 106 instructs the pressure control module 104 to lower the transmission fluid operating pressure at a predetermined first rate until the transmission 22 begins to slip. The pressure adapt module 106 obtains a commanded fluid operating pressure at a point in time when the transmission 22 began to slip. The pressure adapt module 106 then selectively adjusts the first and second learned fluid pressures stored in the memory 102 based on the commanded fluid operating pressure.

During the remedial learn procedure, as discussed in more detail below, the pressure adapt module 106 selectively increases the first and second learned fluid pressures when the transmission 22 slips during regular steady-state operation at the target operating pressure. The pressure adapt module 106 obtains the target operating pressure at a point in time when the transmission 22 began to slip. The pressure adapt module 106 increases the first and second learned fluid pressures based on the target operating pressure obtained.

The current transmission operating state may be determined by a range/state determination module 140 using various methods. For example only, the current transmission operating state may be determined based on measured positions of the first hydraulic actuator 76 for the lock-up clutch 56 and the second hydraulic actuators 78 of the geartrain 44. The positions may be sensed by sensors 142, 144 that output signals (Actuator Positions) indicative of the measured positions. The range/state determination module 140 may output a signal (Range/State) indicative of the current transmission operating state determined. The Range/State signal may also indicate whether the transmission 22 is shifting between two ranges and/or switching between the locked and un-locked states of the TC 42.

The current transmission input torque may be determined by a torque determination module 150 by various methods. For example only, the current transmission input torque may be based on a torque output of the TC 42. The torque output of the TC 42 may be based on the current engine output torque, the current TC 42 lock-up state, and the current TC slip rate. The current engine output torque may be based on one or more engine operating conditions such as, but not limited to, engine air flow, air-fuel ratio, and spark timing. The torque determination module 150 may receive various powertrain signals indicative of the engine operating conditions, the Range/State signal, and the current TC turbine speed and may output a signal (Transmission Input Torque) indicative of the current transmission input torque determined.

The current TC turbine speed may be determined by a TC speed determination module 160 by various methods. For example only, the current TC turbine speed may be determined based on the current transmission operating state and a measured speed of the output shaft 46 of the transmission 22. The current turbine speed may be determined by multiplying the measured speed of the output shaft 46 by the current gear ratio. The speed of the output shaft 46 may be measured by a first speed sensor 162 that outputs a signal (Transmission Speed) indicative of the measured speed. The TC speed determination module 160 may output a signal (TC Turbine Speed) indicative of the current TC turbine speed determined.

The current TC slip rate may also be determined by the TC speed determination module 160. The current TC slip rate may be based on a difference between the current engine speed and the current TC turbine speed. The TC speed determination module 160 may output a signal (TC Slip Rate) indicative of the current TC slip rate determined.

The current transmission temperature may be a measure of a temperature of the fluid within the transmission 22 and may be determined by various methods. For example only, the current transmission temperature may be measured by a sensor 170 that senses a temperature of the fluid and outputs a signal (Transmission Temperature) indicative of the temperature sensed. The sensor 170 may be located in the sump 72.

A slip module 180 may monitor operation of the transmission 22 and determine whether the transmission 22 is slipping. The transmission 22 may be slipping due to one or more operating conditions, such as low fluid operating pressures. In this way, the slip module 180 can also detect a slip condition of the transmission 22. For present purposes, transmission slip is used generally to refer to any relative rotational motion between driving and driven components of the transmission 22 that results in lost rotational motion. Thus, it should be understood that transmission slip is not used to refer to differences in the rotational speeds of the driving and driven components due to designed gear reductions or overdrives.

For example, transmission slip may occur as a result of lost rotational motion between the pump and turbine elements 50, 52 of the TC 42. As another example, transmission slip may occur as a result of lost rotational motion between the intermediate shaft 54 on the input side of the geartrain 44 and the output shaft 46 on the output side of the geartrain 44. Transmission slip may occur within the geartrain 44 when clutches are used to operate the transmission in a particular gear slip.

Transmission slip may be intended or unintended. As one example of intentional transmission slip, there may be lost rotational motion between the pump and turbine elements 50, 52 of the TC 42 while the lock-up clutch 56 is de-actuated (i.e., TC 42 is in an unlocked state). On the other hand, unintentional slip may occur when there is lost rotational motion between the pump and turbine elements 50, 52 while the lock-up clutch 56 is actuated. According to the present disclosure, transmission slip is intended during periods when the pressure adapt module 106 is lowering transmission operating pressures to induce transmission slip. On the other hand, transmission slip is unintended when the transmission slip occurs while operating the transmission 22 at the target operating pressure.

The slip module 180 may determine whether the transmission 22 is slipping based on a current measured rotational speed of the engine 30 (engine speed), the current transmission speed measured by the first speed sensor 162, and the current SS operating state of the transmission 22. A second speed sensor 182 may measure a rotational speed of the crankshaft 32 and thereby output a signal (Engine Speed) indicative of the engine speed based on the rotational speed sensed.

Figure 3:
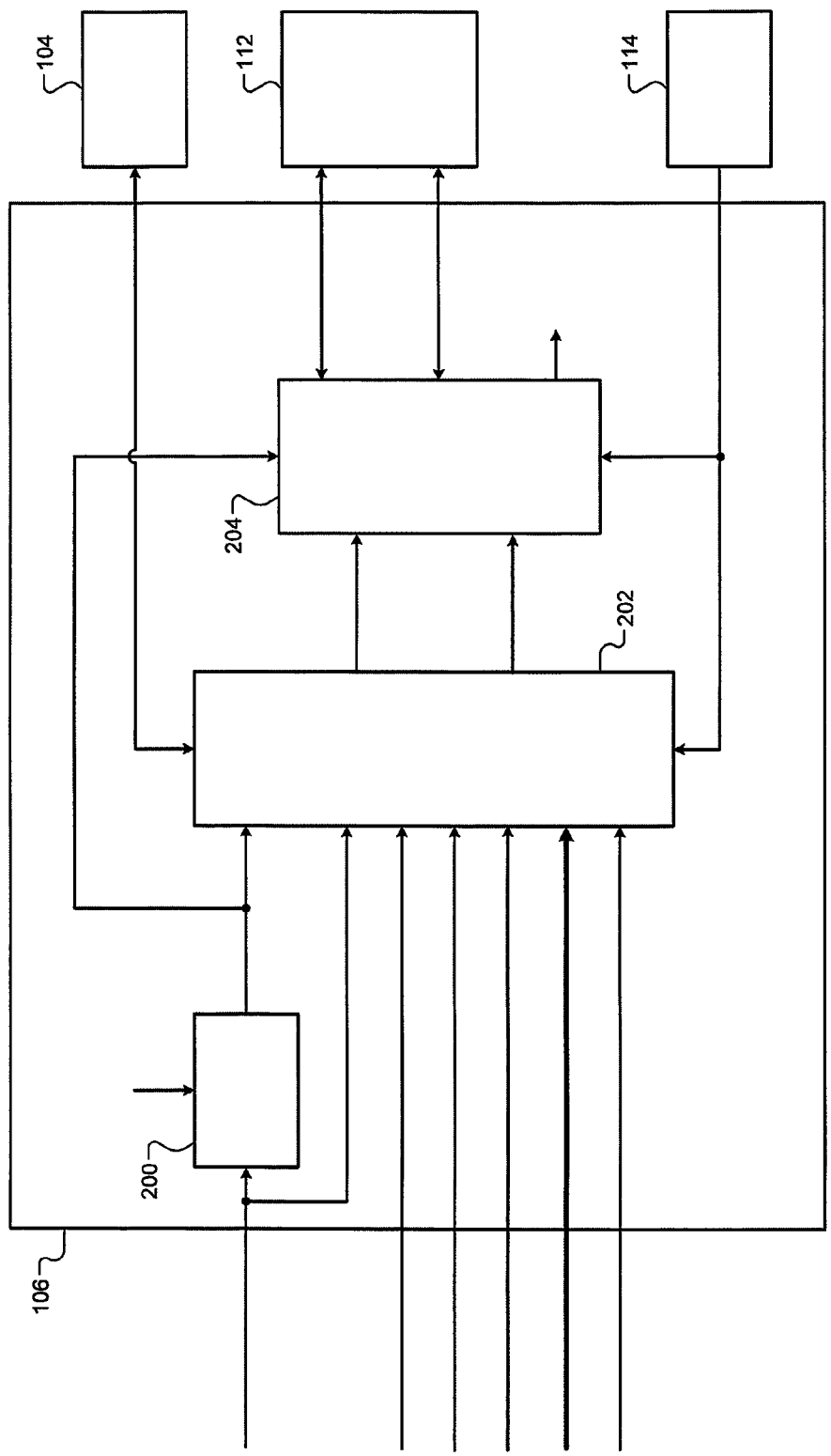
FIG. 3 is a functional block diagram illustrating an exemplary implementation of the pressure adapt module shown in FIG. 2 according to the present disclosure.

With particular reference to FIG. 3, an exemplary implementation of the pressure adapt module 106 is presented. The pressure adapt module 106 includes a range timer module 200, an adapt control module 202, and an adapt processing module 204.

The range timer module 200 determines a total elapsed time (i.e., period) the transmission 22 has operated in the current SS operating state since each of the first and second learned fluid pressures was last adjusted according to one of the active and remedial learn procedures. The total elapsed time can be different for each of the first and second learned fluid pressures depending on when each was last adjusted. The range timer module 200 outputs a signal (Timer) based on the total elapsed time determined for the current SS operating state. Generally, the timer signal will be indicative of the total elapsed time determined. Initially, prior to the execution of one of the active and remedial learn procedures for the first time, the Timer signal may be indicative of a sum of the predetermined control period and the total elapsed time the transmission 22 has operated in the current transmission operating state. The Timer signal may output the sum to enable the execution of the active learn procedure at the earliest opportunity. The range timer module 200 may monitor the Range/State signal and generate the Timer signal based on the Range/State signal. In various implementations, the Timer signal may communicate a count indicative of the total elapsed time.

The adapt control module 202 monitors the transmission operating conditions and selectively executes one of the active learn procedure and the remedial learn procedure based on the operating conditions. The operating conditions include, but are not limited to, the transmission operating state, the total elapsed time, the TC turbine speed, the transmission input torque, the transmission temperature, and transmission slip. The adapt control module 202 may further monitor various other operating conditions of the engine 30 and the transmission 22 via other engine and transmission signals.

Based on the execution of the active and remedial learn procedures, the adapt control module 202 periodically determines a learned minimum fluid pressure. The learned minimum fluid pressure is used by the adapt processing module 204 to selectively adjust the first and second learned fluid pressures for the corresponding SS operating state. A new learned minimum fluid pressure may be obtained each time the active and remedial learn procedures are executed.

The adapt control module 202 may output a first signal (Learned Minimum Fluid Pressure) indicative of the learned minimum fluid pressure determined. The adapt control module 202 may also communicate various information regarding the learn procedure executed in a second signal (Learn Info). The Learn Info signal may include information such as, but not limited to, the current SS operating state, which learn procedure was executed, the target operating pressure at the beginning of the learn procedure, and whether the learn procedure completed successfully.

Generally, the adapt control module 202 will execute the active learn procedure when general enablement criteria are met, the transmission 22 is operating in a steady-state, the total elapsed time is greater than the predetermined control period, and the transmission 22 is operating within one of a first learn region and a second learn region. The adapt control module 202 executes the remedial learn procedure when the transmission 22 is operating in a steady-state and an unintended transmission slip condition is detected.

The adapt processing module 204 receives the learned minimum fluid pressure and the information regarding the learn procedure executed. The adapt processing module 204 selectively adjusts one or both the first and second learned fluid pressures based on the learned minimum fluid pressure, various control parameters, and other information received. The adapt processing module 204 adjusts the first and second learned fluid pressures by determining new first and/or second learned fluid pressures and storing the new values in the learned pressure data tables 112. After storing a new first and/or second learned fluid pressure, the adapt processing module 204 instructs the range timer module 200 to reset the total elapsed time for the corresponding first and/or second learned fluid pressures. The adapt processing module 204 may output a signal (Timer Reset) providing the instructions.

The adapt processing module 204 limits the new first and second learned fluid pressures to a predetermined pressure range. The predetermined pressure range may be a single, predetermined pressure range for all transmission operating states or, alternatively, may be a function of the transmission operating state. Additionally, when the learned minimum fluid pressure was obtained by executing the active learn procedure, the adapt processing module 204 selectively limits the new learned pressure gain and offset defined by the new first and second learned fluid pressures.

When limiting the new learned pressure gain or offset, the adapt processing module 204 determines the new first and/or second learned fluid pressure based on a first confidence in the first learned fluid pressure and a second confidence in the second learned fluid pressure. The first and second confidences are based on the total elapsed time since the first and second learned fluid pressures were last determined, respectively. The first and second confidences may be determined according to the following equation:

$$\text{confidence} = 1 - (\text{total elapsed time}/\text{predetermined control period}). \quad (3)$$

According to equation 3, a confidence equal to one is the highest. Additionally, it will be understood that as the total elapsed time increases, the confidence decreases. Alternatively or additionally, the confidence for a particular learned fluid pressure may be set to 1 to always use fast limiting or may be set to zero to always use slow limiting as discussed in further detail below.

For clarity, it will be assumed for the following discussion that the learned minimum fluid pressure is obtained for the first learn region. With this in mind, when determining each new first and second learned fluid pressure, the adapt processing module 204 determines a new learned pressure gain and offset for a new learned pressure trendline. The new learned pressure trendline is defined by the learned minimum fluid pressure for the first learn region and the learned fluid pressure for the second learn region stored in the memory 102.

The adapt processing module 204 then compares the new learned pressure gain and offset and the current learned pressure gain and offset defined by the first and second learned fluid pressures stored in the memory 102. The adapt processing module 204 further compares the new learned pressure gain and offset to a predetermined pressure gain and a predetermined pressure offset. The predetermined pressure gain and offset are based on the current SS operating state. Based on the comparisons, the adapt processing module 204 selectively limits the new learned pressure gain and offset defined by the new first and second learned fluid pressures according to one of two limiting methods. The two limiting methods may be referred to as a "slow limiting" method or a "fast limiting" method.

Slow limiting limits a difference (i.e., change) between the new learned fluid pressure and the previous learned fluid pressure in order to limit the new learned fluid pressure gain and offset to within the predetermined pressure gain and offset. Generally, the slow limiting method will be used when the confidence in learned fluid pressure of the opposite learn region is greater than the confidence in the current learn region. According to the present example, slow limiting will be used when the confidence in the learned fluid pressure of the second learn region is the greatest.

Fast limiting keeps the new learned fluid pressure and adjusts the learned fluid pressure for the opposite learn region in order to limit the new learned fluid pressure gain and offset to within the predetermined pressure gain and offset. Generally, the slow limiting method will be used when the confidence in learned fluid pressure of the opposite learn region is greater than the confidence in the current learn region. According to the present example, slow limiting will be used when the confidence in the learned fluid pressure of the second learn region is the greatest. When the new learned fluid pressure is greater than the previous learned fluid pressure and limiting is desired, fast limiting may always be used.

If the new learned pressure gain is less than the predetermined pressure gain, the adapt processing module 204 limits the corresponding new learned pressure gain to the predetermined pressure gain greater than zero. For example, if the new learned pressure gain is less than the predetermined pressure gain, the adapt processing module 204 determines a new first and/or second learned fluid pressure defining a new learned pressure gain equal to the predetermined pressure gain. Otherwise, the adapt processing module 204 stores the new learned minimum fluid pressure as one of the new first or second learned fluid pressure. By limiting the learned pressure gain in the foregoing manner, undesirably low learned pressure gains can be avoided. In the present example, learned pressure gains less than zero are undesirable because generally it will be desired to increase the transmission fluid operating pressures with increasing transmission input torque. Other learned pressure gains greater than zero may be undesirable based on an expected or desired variation in the learned pressure gain.

If the new learned pressure gain is greater than the current learned pressure gain, the adapt processing module 204 limits the new learned pressure offset to a predetermined pressure offset greater than zero. For example, if the new learned pressure offset is less than the predetermined pressure offset, the adapt processing module 204 determines a new first and/or second learned fluid pressure defining a new pressure offset equal to the predetermined pressure offset. Otherwise, the adapt processing module 204 will store the new learned minimum fluid pressure as one of the first or second learned fluid pressure. By limiting the learned pressure offset in the foregoing manner, undesirably low learned pressure offsets can be avoided. In the present example, learned pressure offsets less than zero are undesirable because such offsets may result in negative target transmission fluid operating pressures. Other learned pressure offsets greater than or equal to zero may be undesirable based on an expected or desired variation in the learned pressure offset.

With particular reference to FIGS. 4-7, the limiting of the new learned pressure gain and offset by the adapt processing module 204 will be described in further detail. FIGS. 4-7 are exemplary plots of learned fluid pressures (y-axis) as a function of transmission input torque (x-axis). In FIGS. 4-7, the first and second learned fluid pressures currently stored in the memory 102 are designated by reference numerals 210 and 212, respectively, while the corresponding current learned pressure trendline is designated by reference numeral 214. The learned minimum fluid pressure for the first and second regions are designated by reference numerals 220 and 222, respectively, while a corresponding minimum pressure trendline is designated by reference numeral 224.

The new first and second learned fluid pressures limited by the adapt processing module 204 are designated by reference numerals 230 and 232, respectively, while the corresponding new learned pressure trendline is designated by reference numeral 234. The offsets of the trendlines 214, 224, 234 are designated by reference numerals 216, 226, and 236, respectively. The first learn region and the second learn region are designated by reference numerals 240 and 242, respectively. In FIGS. 4-7, the transmission input torques in each of the first and second learn regions associated with the various fluid pressures are illustrated as nearly equal, for simplicity. It will be appreciated that the transmission input torques associated with the various fluid pressures may vary within the corresponding predetermined first and second transmission input torque ranges.

Figure 5:
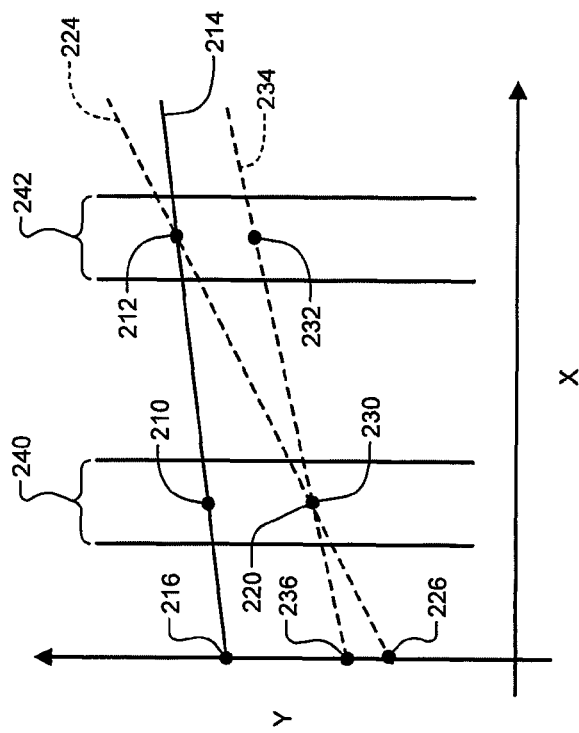
FIG. 5 is a plot of learned fluid pressures as a function of transmission input torque illustrating a first fast limiting example according to the present disclosure.
Figure 4:
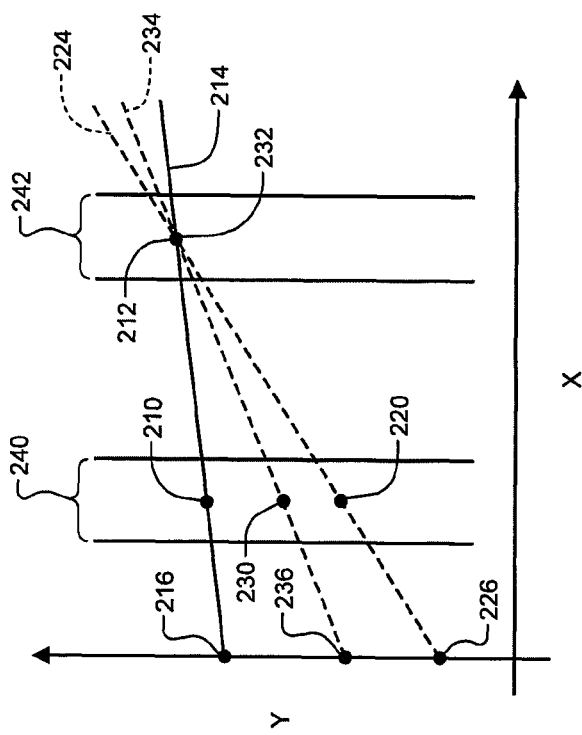
FIG. 4 is a plot of learned fluid pressures as a function of transmission input torque illustrating a first slow limiting example according to the present disclosure.

FIGS. 4-5 are exemplary plots of learned fluid pressures as a function of transmission input torque illustrating a first slow limiting example and a first fast limiting example, respectively, for the first learn region. The slow limiting example of FIG. 4 illustrates the situation in which the second confidence in the second learned fluid pressure 212 is greater than the first confidence in the first learned fluid pressure 210 and the new learned pressure gain is greater than the current learned pressure gain. The adapt processing module 204 stores a new first learned fluid pressure 230 such that the new learned pressure offset 236 defined by the new learned pressure trendline 234 is equal to the predetermined pressure offset. FIG. 4 is referred to as a slow limiting example since the new first learned fluid pressure 230 stored in the memory 102 is limited to a pressure between the learned minimum pressure 220 and the first learned fluid pressure 210.

The fast limiting example of FIG. 5 illustrates the situation in which the second confidence in the second learned fluid pressure 212 is less than the first confidence in the first learned fluid pressure 210 and the new learned pressure gain is greater than the current learned pressure gain. The adapt processing module 204 stores the learned minimum pressure 220 as the new first learned fluid pressure 230 and stores a new second learned fluid pressure 232 such that the new learned pressure offset 236 defined by the new learned pressure trendline 234 is equal to the predetermined pressure offset. FIG. 5 is referred to as a fast limiting example, since the new first and second learned fluid pressures 230, 232 stored in the memory 102 favor the learned minimum pressure 220.

FIGS. 6-7 are exemplary plots of learned fluid pressures as a function of transmission input torque illustrating a second slow limiting example and a second fast limiting example, respectively, for the second learn region. The slow limiting example of FIG. 6 illustrates the situation in which the second confidence in the second learned fluid pressure 212 is less than the first confidence in the first learned fluid pressure 210 and the new learned pressure gain is less than the current learned pressure gain. The adapt processing module 204 determines a new second learned fluid pressure 232 such that the new learned pressure gain defined by the new learned pressure trendline 234 is equal to the predetermined pressure gain. FIG. 6 is referred to as a slow limiting example since the new second learned fluid pressure 232 is limited to a pressure between the learned minimum pressure 222 and the second learned fluid pressure 212.

The fast limiting example of FIG. 7 illustrates the situation in which the second confidence in the second learned fluid pressure 212 is greater than the first confidence in the first learned fluid pressure 210 and the new learned pressure gain is less than the current learned pressure gain. The adapt processing module 204 stores new first and second learned fluid pressures 230, 232 such that the new learned pressure gain is equal to the predetermined pressure gain. FIG. 7 is referred to as a fast limiting example since the new first and second learned fluid pressures 230, 232 favor the learned minimum pressure 222.

When the learned minimum fluid pressure was obtained by executing the remedial learn procedure, the adapt processing module 204 increases both the first and second learned fluid pressures, while maintaining the current learned pressure gain. The new first and second learned fluid pressures define a new learned pressure trendline passing through an operating point defined by the learned minimum fluid pressure and corresponding transmission input torque. The new first and second learned fluid pressures may be determined according to the following general equation:

$$\text{Learned } P_{NEW} = \text{Learned } P_{STORED} + (\text{Learned } P_{SLIP} - \text{Learned } P'_{STORED}). \quad (4)$$

In equation 4, Learned $P_{NEW}$ is the new learned fluid pressure at the transmission input torque of the learned fluid pressure stored in the memory 102 and Learned $P_{STORED}$ is the learned fluid pressure stored in the memory 102. Learned $P_{SLIP}$ is the transmission fluid operating pressure when the unintended transmission slip was detected and Learned $P'_{STORED}$ is a calculated pressure at the transmission input torque when the unintended slip was detected. Learned $P'_{STORED}$ can be determined by interpolating between or extrapolating out the first and second learned fluid pressures stored in the memory 102. In other words, Learned $P'_{STORED}$ is a pressure obtained from the learned pressure trendline defined by the first and second learned fluid pressures stored in the memory 102.

Thus, it will be appreciated that the new learned pressure trendline defined by the new first and second learned fluid pressures passes through a point defined by the transmission fluid operating pressure and input torque obtained by executing the remedial learn procedure. Additionally, it will be appreciated that the new learned pressure gain will be equal to the previous learned pressure gain, while the new learned pressure offset will be greater than the previous learned pressure offset by an amount equal to the increase in the first and second learned fluid pressures.

With continued reference to FIGS. 1-7, operation of the control system 100 generally and, more specifically, operation of the various modules of the control module 14 according to the present disclosure will now be described in further detail. During operation of the vehicle system 10, the control module 14 outputs control signals used to operate the transmission 22 in a desired range and TC lock-up state. The control signals are based on the various inputs received, including inputs from the driver interface devices 80 and the sensors of the powertrain 12. The control module 14 also outputs the pressure control signal used to control the pressure of the fluid supplied to the various hydraulic actuators used to operate the transmission 22 in the desired range and TC lock-up state. The control module 14 outputs the pressure control signal based on the target operating pressure determined by the pressure control module 104.

According to the present disclosure, the pressure adapt module 106 monitors the transmission operating conditions and determines whether to execute one of the active learn procedure and the remedial procedure based on the operating conditions. Generally, the active learn procedure is executed when general enablement criteria are met and the transmission 22 is operating in one of the SS operating states. Execution of the active learn procedure further requires that the transmission 22 is operating within one of the first or second learn regions and the total elapsed time for the corresponding first or second learned pressure is greater than the corresponding predetermined control period. The remedial learn procedure, discussed further below, is executed when the transmission 22 is operating in a steady-state and an unintended transmission slip condition is detected.

The general enablement criteria for the active learn procedure will generally be met, unless an overriding reason for not executing the active learn procedure exists. As one example, an overriding reason may exist while the control system 100 is performing a diagnostic test of one or more components of the powertrain 12. As another example, an overriding reason may exist when a problem has been detected with the output of one or more sensors used during the active learn procedure, such as the pressure sensor 190 that senses the transmission fluid operating pressure. As yet another example, overriding reason may exist during periods when an emission control procedure, such as air purge, is executed.

If the transmission 22 is operating in one of the SS operating states, the pressure adapt module 106 determines whether the transmission 22 is operating within one of the first learn region or the second learn region. More specifically, the pressure adapt module 106 determines whether the current TC turbine speed, transmission input torque, and transmission temperature fall within the predetermined first or second TC turbine speed, transmission input torque, and transmission temperature ranges of the first and second learn regions for the current SS operating state.

While the transmission 22 is operating in one of the first and second learn regions, the control module 14 executes the active learn procedure. During the active learn procedure, the pressure adapt module 106 instructs the pressure control module 104 to lower the transmission operating pressure at a predetermined first rate to induce the transmission 22 to slip. When the transmission 22 begins to slip, the pressure adapt module 106 obtains the commanded transmission operating pressure (i.e., learned minimum fluid pressure), the TC turbine speed, and the transmission input torque at the point in time when the transmission slip was detected. Based on the learned minimum fluid pressure, the TC turbine speed, and the transmission input torque obtained, the pressure adapt module 106 selectively adjusts the first and/or second learned fluid pressures as previously discussed. The pressure adapt module 106 further instructs the pressure control module 104 to increase the transmission operating pressure at a predetermined second rate. The pressure control module 104 may increase the transmission operating pressure until the new target operating pressure is reached.

If the pressure adapt module 106 detects an unintended transmission slip while monitoring the transmission operating conditions, the pressure adapt module 106 obtains the target fluid pressure and the transmission input torque at the point when the unintended slip occurred. Based on the target fluid operating pressure and the transmission input torque obtained, the pressure adapt module 106 increases the first and second learned fluid pressures as previously discussed.

With reference to FIGS. 8-12, an exemplary method 300 for adaptive control of steady-state transmission fluid operating pressures according to the present disclosure is presented. The method 300 may be implemented in one or more modules of a transmission control system, such as the transmission control system 100.

Figure 8:
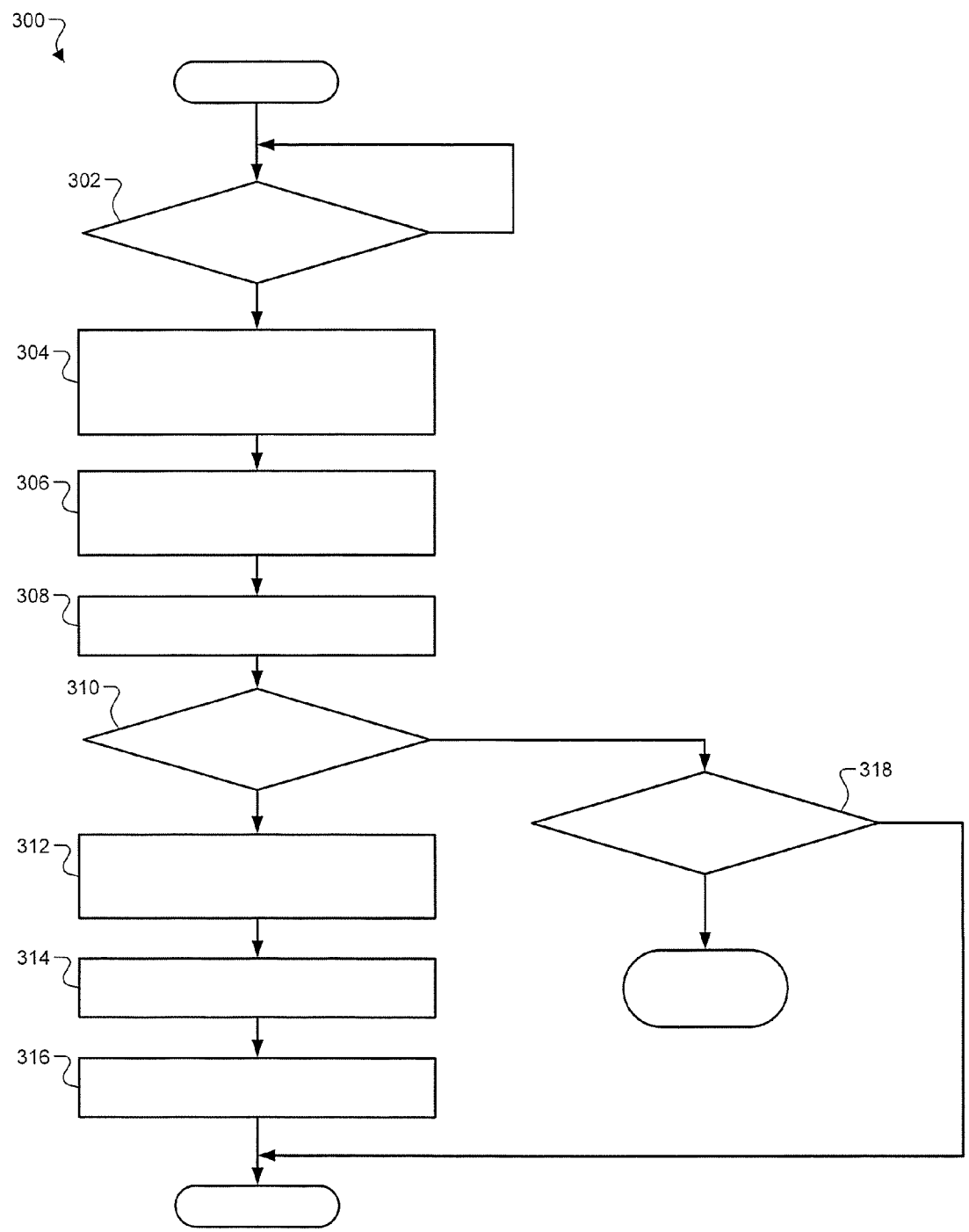
FIGS. 8-12 are flow diagrams illustrating an exemplary method for adaptive control of steady-state transmission fluid operating pressures according to the present disclosure.

With particular reference to FIG. 8, the method 300 begins at 302 where control determines whether the transmission is operating in a steady-state. If yes, then control proceeds at 304, otherwise control ends as shown. At 304, control operates the transmission at a target fluid operating pressure determined based on a first learned fluid pressure and a second learned fluid pressure stored in memory. The target fluid operating pressure may be calculated based on the first and second learned fluid pressures and various control parameters according to equation 1 and equation 2 discussed above.

At 306, control determines the total elapsed time in the current steady-state operating state since each of the first and second learned fluid pressures stored in memory were last adjusted according to the method 300.

At 308, control monitors transmission operating conditions including, but not limited to, transmission fluid operating pressure, transmission slip, TC turbine speed, transmission input torque, transmission temperature, and total elapsed time.

At 310, control determines whether unintended transmission slip has been detected. If yes, then control proceeds at 312, otherwise control proceeds at 318. At 312, control obtains the target fluid operating pressure and the transmission input torque at the point in time when the unintended transmission slip was detected and control proceeds at 314. At 314, control determines new first and second learned fluid pressures based on the target fluid operating pressure and input torque obtained at 312 and the first and second learned fluid pressures stored in memory. The new first and second learned fluid pressures may be determined according to equation 4 as discussed above. At 316, control stores the new first and second learned fluid pressures in memory. From 316, control returns to start as shown to begin another control loop according to the method 300.

At 318, control determines whether general enablement criteria for executing the active learn procedure are met. The general enablement criteria include criteria establishing overriding reasons for not executing the active learn procedure as discussed above. If yes, then control proceeds at 320 (FIG. 9), otherwise control returns to start, as shown, to begin another control loop according to the method 300.

Figure 9:
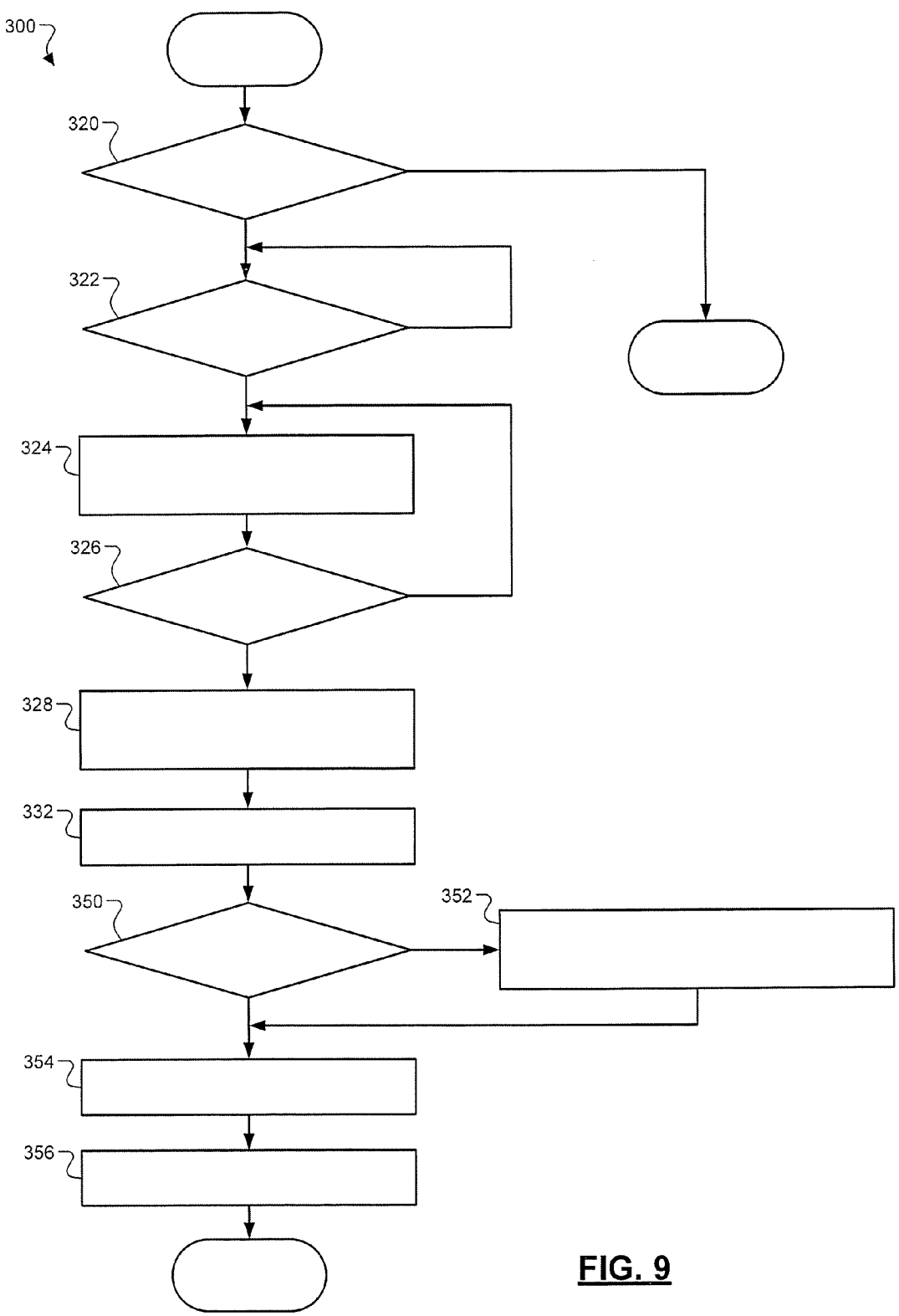

Referring now to FIG. 9, control at 320 determines whether the transmission is operating within one of the first learn region and the second learn region. If yes, then control proceeds at 322, otherwise control loops back at 318 as shown. At 322, control determines whether the total elapsed time for the corresponding one of the first and second learned fluid pressure stored in memory is greater than the corresponding predetermined control period. If yes, then control proceeds in 324, otherwise, control returns at 320 as shown.

At 324, control lowers the transmission fluid operating pressure at a predetermined first rate. Control lowers the transmission fluid operating pressure from the target fluid operating pressure. At 326, control determines whether the transmission is slipping. If yes, then control proceeds at 328, otherwise control returns at 324 where control continues to lower the transmission fluid operating pressure. At 328, control obtains the minimum transmission fluid operating pressure and corresponding transmission input torque. The minimum transmission fluid operating pressure is the commanded transmission fluid operating pressure when the transmission began to slip.

Figure 10:
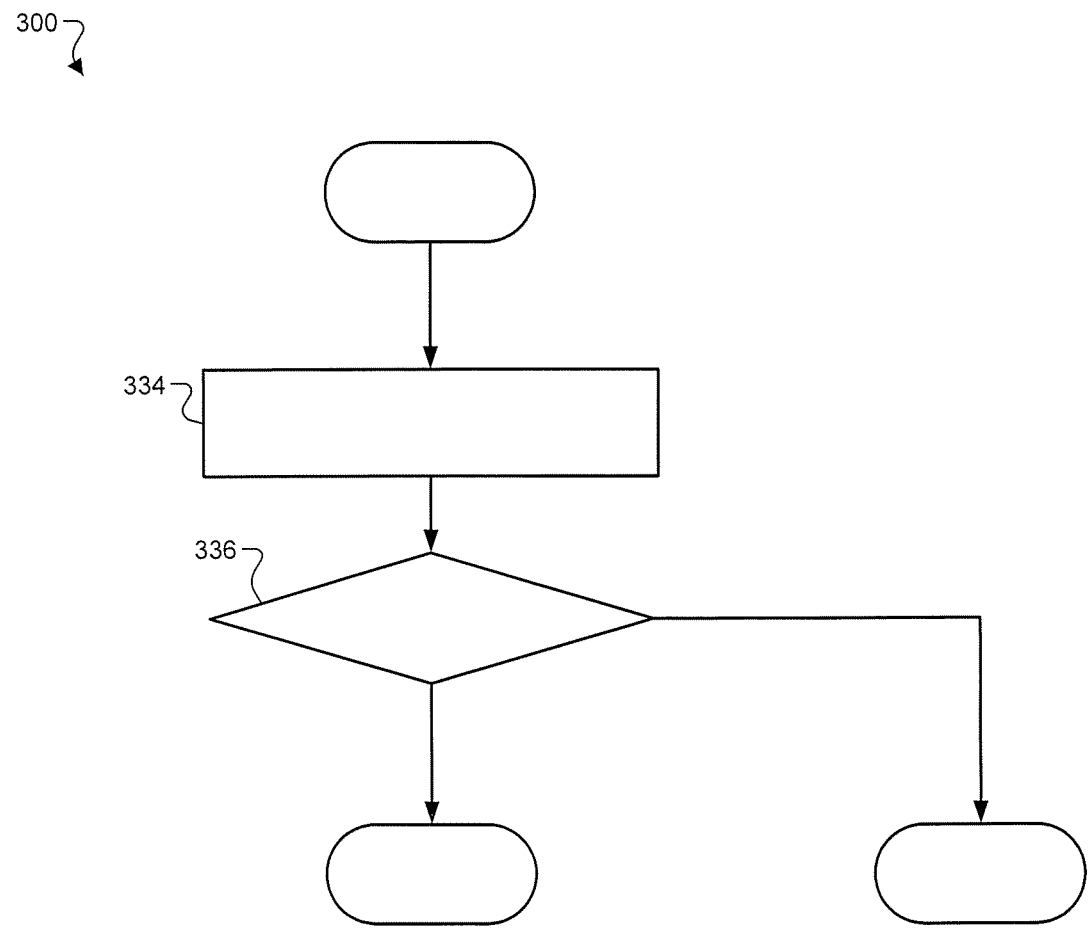

At 332, control determines new first and/or second learned fluid pressures for the corresponding learn region (e.g., first learn region or second learn region) based on the minimum transmission fluid operating pressure and the transmission input torque obtained at 328. Referring now to FIG. 10, exemplary steps for determining the new first and/or second learned fluid pressures are shown. At 334, control determines a first confidence value for the first learn region (i.e., the first learned fluid pressure) and a second confidence value for the second learn region (i.e., the second learned fluid pressure) based on the corresponding total elapsed time determined at 306 (FIG. 8).

At 336, control compares the minimum transmission fluid operating pressure and a corresponding one of the first and second learned fluid pressures stored in memory to determine whether the minimum transmission fluid operating pressure will result in a learned pressure gain increase. In other words, control determines whether the minimum transmission fluid operating pressure will result in a new learned pressure gain greater than the learned pressure gain defined by the first and second learned fluid pressures stored in memory. The learned pressure gain will increase if the minimum transmission fluid operating pressure is for the first learn region and is less than the first learned fluid pressure stored in memory. Alternately, the learned pressure gain will increase if the minimum transmission fluid operating pressure is for the second learn region and is greater than the second learned fluid pressure stored in memory. If the learned pressure gain will increase, then control proceeds at 338 (FIG. 11), otherwise control proceeds at 344 (FIG. 11).

Figure 11:
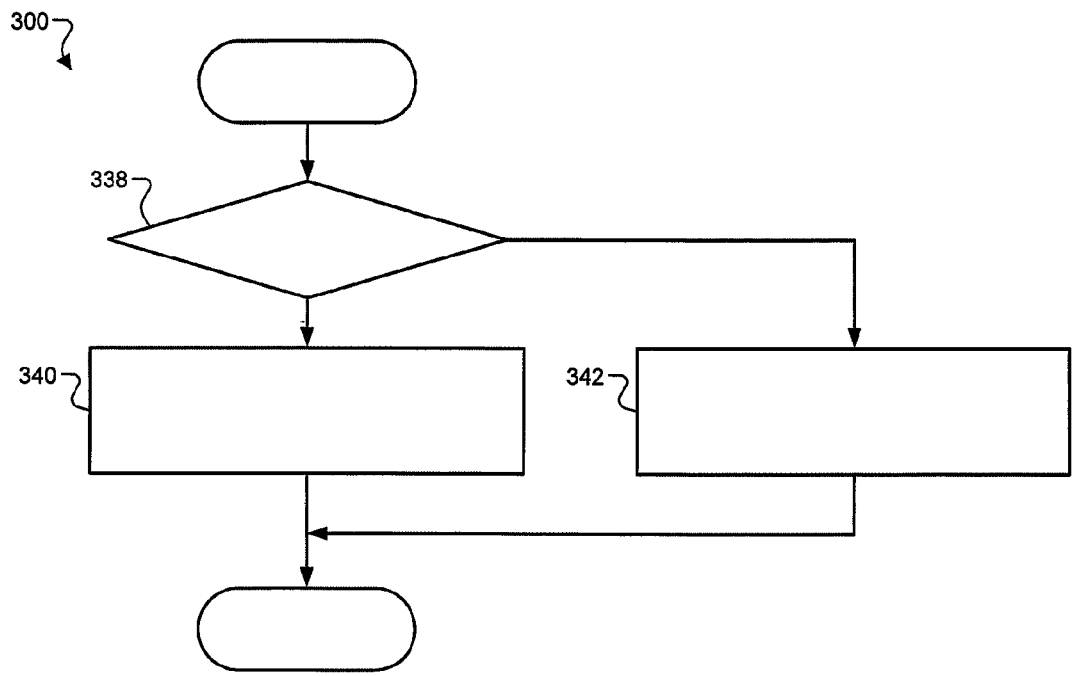

Referring now to FIG. 11, control at 338 determines whether the first confidence value for the first learn region is greater than the second confidence value for the second learn region. If yes, then control proceeds at 340, otherwise control proceeds at 342.

At 340, control determines a new first learned fluid pressure and a new second learned fluid pressure based on the minimum transmission fluid operating pressure and a predetermined pressure offset. Control sets the new first learned fluid pressure to the minimum transmission fluid operating pressure. Control determines the second learned fluid pressure such that a new learned pressure offset defined by the new learned pressure trendline is equal to the predetermined pressure offset. It will be appreciated that control at 340 is a fast limiting example, since the new first and second learned fluid pressures favor the new learned minimum transmission operating pressure.

At 342, control determines a new first learned fluid pressure based on the second learned fluid pressure stored in memory and a predetermined pressure offset. Control determines the new first learned fluid pressure such that a new learned pressure offset defined by a new learned pressure trendline is equal to the predetermined pressure offset. It will be appreciated that control at 342 is a slow limiting example since the new first fluid pressure is limited to a pressure between the minimum transmission operating pressure and the previous first learned fluid pressure.

Figure 12:
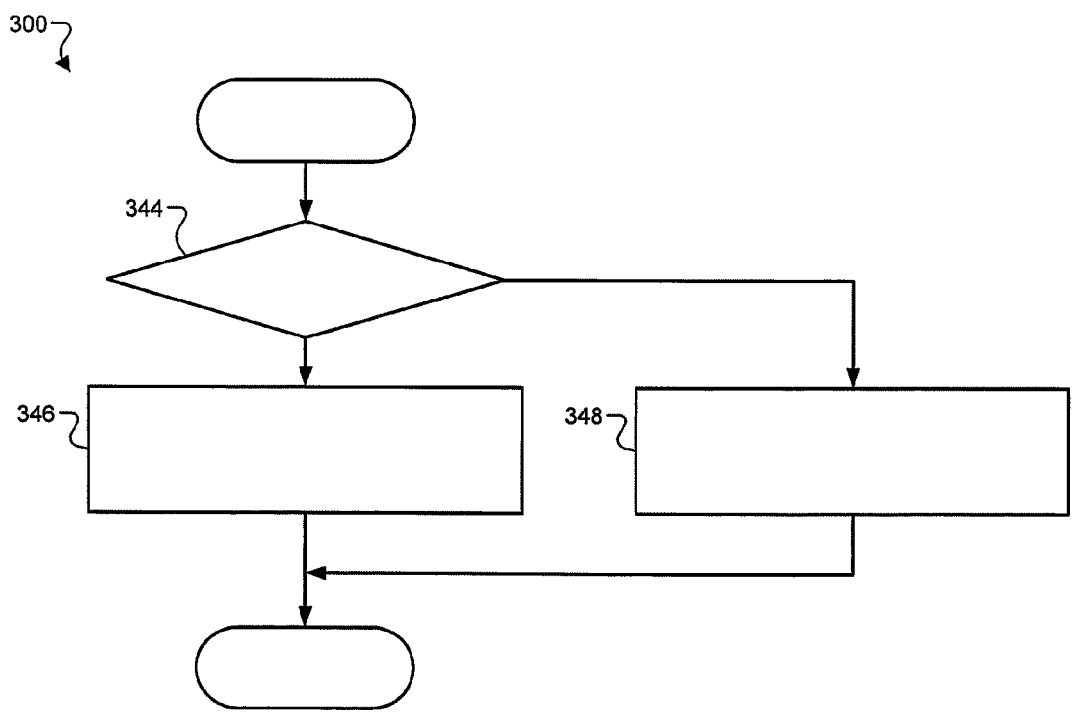

Referring now to FIG. 12, control at 344 determines whether the first confidence value for the first learn region is greater than the second confidence value for the second learn region. If yes, then control proceeds at 346, otherwise, control proceeds at 348.

At 346, control determines a new second learned fluid pressure based on the first learned fluid pressure stored in memory and a predetermined pressure gain. Control determines the new second learned pressure such that a new learned pressure gain defined by the first learned fluid pressure stored in memory and the new second learned pressure is equal to the predetermined pressure gain. It will be appreciated that control at 346 is a slow limiting example since control limits the new second learned pressure to a pressure between the minimum transmission operating pressure and the previous second learned fluid pressure.

At 348, control determines a new first learned fluid pressure and a new second learned fluid pressure based on the minimum transmission fluid operating pressure and a predetermined pressure gain. Control sets the new second learned fluid pressure equal to the minimum transmission fluid operating pressure. Control determines the new first learned fluid pressure such that a new learned pressure gain defined by the new first and second learned fluid pressures is equal to the predetermined pressure gain. It will be appreciated that control at 348 is a fast limiting example, since the new first and second fluid pressures favor the minimum transmission fluid operating pressure.

Referring back to FIG. 9, control at 350 determines whether the new first and/or second learned fluid pressures determined at one of 340, 342, 346, 348 are within a predetermined pressure range. If yes, then control proceeds at 354, otherwise control proceeds at 352. The predetermined pressure range may be a single, predetermined pressure range for all transmission operating states or, alternatively, may be a function of the transmission operating state.

At 352, control limits the new first and/or second learned fluid pressures determined at one of 340, 342, 346, 348 to pressures within the predetermined pressure range. If the new learned fluid pressure is greater than a predetermined maximum pressure defining an upper limit of the predetermined pressure range, control sets the new learned fluid pressure to the predetermined maximum pressure. If the new learned fluid pressure is less than a predetermined minimum pressure defining a lower limit of the predetermined pressure range, control sets the new learned fluid pressure to the predetermined minimum pressure.

At 354 stores the new first and/or second learned fluid pressures determined at one of 340, 342, 346, 348, 352. At 356, control resets the total elapsed time for the new first and/or second learned fluid pressures stored at 354. From 356, control returns to start (FIG. 8) as shown to begin another control loop according to the method 300.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a transmission, comprising:
a pressure control module that:
determines a first learned pressure based on a first torque range of a predetermined steady-state of said transmission and a first transmission turbine speed of said predetermined stead-state, and a second learned pressure based on a second torque range of said predetermined stead-state and a second transmission turbine speed of said predetermined stead-state, and
operates a hydraulic control system of said transmission at a target pressure during said predetermined steady-state based on said first learned pressure and said second learned pressure; and
a pressure adapt module that selectively adjusts at least one of said first learned pressure and said second learned pressure based on a first pressure at which a slip condition of said transmission occurs.

2. The control system of claim 1, wherein said pressure adapt module induces said slip condition when an input torque of said transmission is within one of said predetermined first torque range and said predetermined second torque range, and a torque converter speed of said transmission is within one of a predetermined first speed range associated with said predetermined first torque range and a predetermined second speed range associated with said predetermined second torque range.

3. The control system of claim 2, wherein said pressure adapt module induces said slip condition by instructing said pressure control module to lower an operating pressure of said hydraulic control system from said target pressure at a predetermined first rate.

4. The control system of claim 1, wherein said pressure adapt module increases said first and second learned pressures by a difference between said target pressure and said first pressure when said slip condition is an unintended slip condition that occurs while operating said transmission at said target pressure.

5. The control system of claim 1, wherein said target pressure is based on a learned pressure gain and a learned pressure offset defined by said first and second learned pressures.

6. The control system of claim 5, wherein said pressure adapt module limits an increase in said learned pressure gain by adjusting at least one of said first learned pressure and said second learned pressure based on said first pressure and a predetermined pressure offset.

7. The control system of claim 5, wherein said pressure adapt module limits a decrease in said learned pressure gain by adjusting at least one of said first learned pressure and said second learned pressure based on said first pressure and a predetermined pressure gain.

8. The control system of claim 1, wherein said pressure adapt module adjusts at least one of said first learned pressure and said second learned pressure based on a first elapsed time since said pressure adapt module adjusted said first learned pressure and a second elapsed time since said pressure adapt module adjusted said second learned pressure.

9. The control system of claim 1, wherein said hydraulic control system controls operation of a torque converter lock-up mechanism of said transmission.

10. The control system of claim 1, wherein said hydraulic control system controls a mechanism selectively engageable with a geartrain of said transmission for effecting gear changes.

11. A method for controlling a transmission, comprising:
determining a first learned pressure based on a first torque range of a predetermined steady-state of said transmission and a first transmission turbine speed of said predetermined stead-state and a second learned pressure based on a second torque range of said predetermined stead-state and a second transmission turbine speed of said predetermined stead-state;
operating a hydraulic control system of said transmission at a target pressure during said predetermined steady-state based on said first learned pressure and said second learned pressure; and
selectively adjusting at least one of said first learned pressure and said second learned pressure based on a first pressure at which a slip condition of said transmission occurs.

12. The method of claim 11, further comprising inducing said slip condition when an input torque of said transmission is within one of said predetermined first torque range and said predetermined second torque range, and a torque converter speed of said transmission is within one of a predetermined first speed range associated with said predetermined first torque range and a predetermined second speed range associated with said predetermined second torque range.

13. The method of claim 12, wherein said inducing said slip condition includes lowering an operating pressure of said hydraulic control system from said target pressure at a predetermined first rate.

14. The method of claim 11, wherein said selectively adjusting includes increasing said first and second learned pressures by a difference between said target pressure and said first pressure when said slip condition is an unintended slip condition that occurs during said operating said hydraulic system at said target pressure.

15. The method of claim 11, further comprising:
determining a learned pressure gain based on said first and second learned pressures;
determining a learned pressure offset based on said first and second learned pressures; and
determining said target pressure based on said learned pressure gain and said learned pressure offset.

16. The method of claim 15, wherein said selectively adjusting includes limiting an increase in said learned pressure gain by adjusting at least one of said first learned pressure and said second learned pressure based on said first pressure and a predetermined pressure offset.

17. The method of claim 15, wherein said selectively adjusting includes limiting a decrease in said learned pressure gain by adjusting at least one of said first learned pressure and said second learned pressure based on said first pressure and a predetermined pressure gain.

18. The method of claim 11, wherein said selectively adjusting includes adjusting at least one of said first learned pressure and said second learned pressure based on a first elapsed time since last adjusting said first learned pressure and a second elapsed time since last adjusting said second learned pressure.

19. The method of claim 11, wherein said hydraulic control system controls operation of a torque converter lock-up mechanism of said transmission.

20. The method of claim 11, wherein said hydraulic control system controls a mechanism selectively engageable with a geartrain of said transmission for effecting gear changes.

* * * * *